United States Patent [19]
Silverwater

[11] 3,785,332
[45] Jan. 15, 1974

[54] MAGNETIC PRESSURE INDICATOR

[75] Inventor: Bernard F. Silverwater, Plainview, N.Y.

[73] Assignee: Pall Corporation, Glen Cove, N.Y.

[22] Filed: Jan. 31, 1972

[21] Appl. No.: 222,266

[52] U.S. Cl. .................................... 116/70, 210/90
[51] Int. Cl. .............................................. G01l 19/12
[58] Field of Search .............. 116/70, 117; 210/90; 200/81; 137/554; 340/366

[56] References Cited
UNITED STATES PATENTS

| | | | |
|---|---|---|---|
| 2,942,572 | 6/1960 | Pall | 116/70 X |
| 3,077,176 | 2/1963 | Pall et al. | 116/70 |
| 3,077,854 | 2/1963 | Pall | 116/70 |
| 3,140,690 | 7/1964 | Siebel | 116/70 |
| 3,187,711 | 6/1965 | Compolong | 116/70 |
| 3,212,471 | 10/1965 | Willis | 116/70 |

Primary Examiner—Louis Capozi
Attorney—Janes & Chapman

[57] ABSTRACT

A magnetic differential pressure indicator is provided for detecting and indicating a pressure differential thereacross that is greater than a predetermined value in a fluid system. A loose nonmagnetic ball detent prevents resetting of the magnetic indicating means after actuation.

20 Claims, 4 Drawing Figures

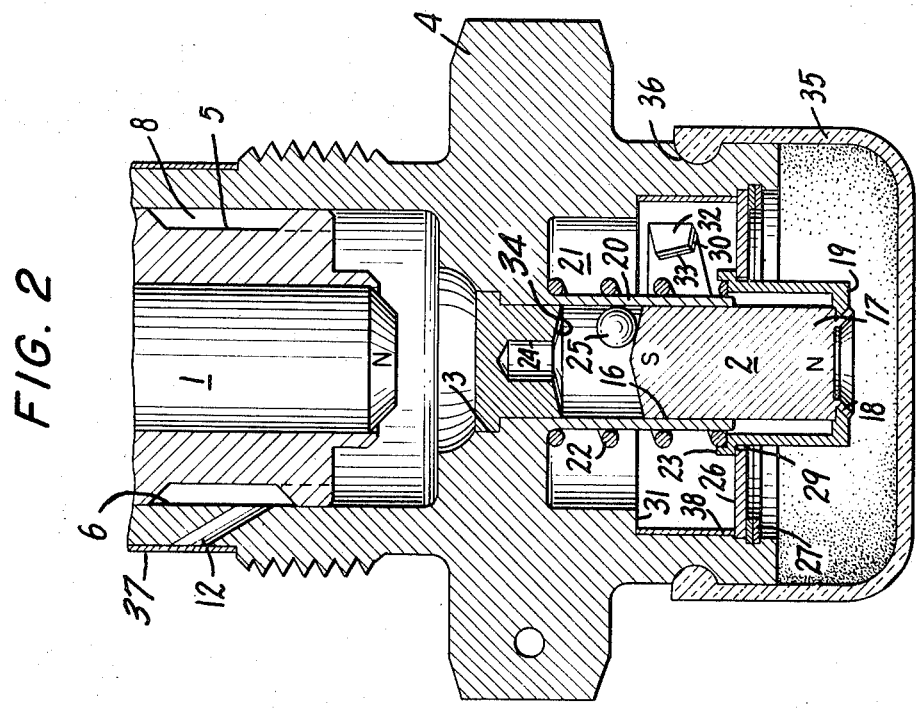
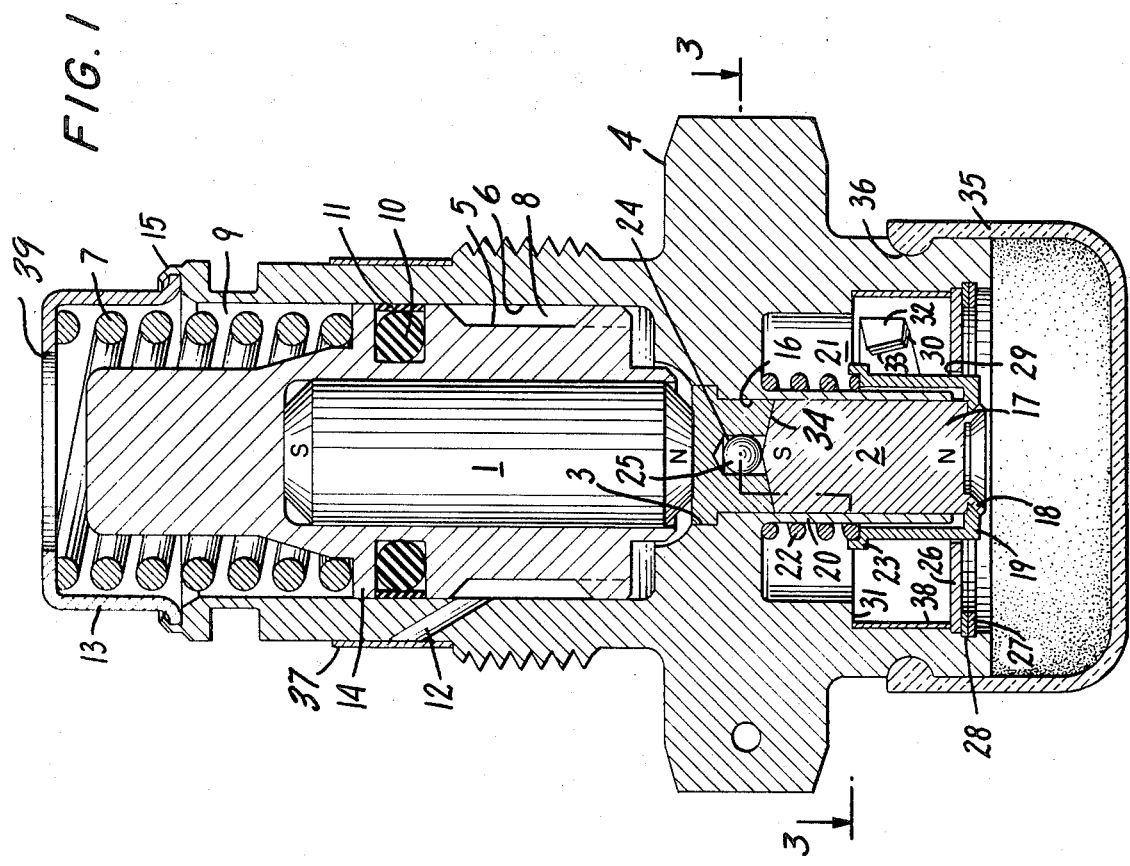
FIG. 1
FIG. 2

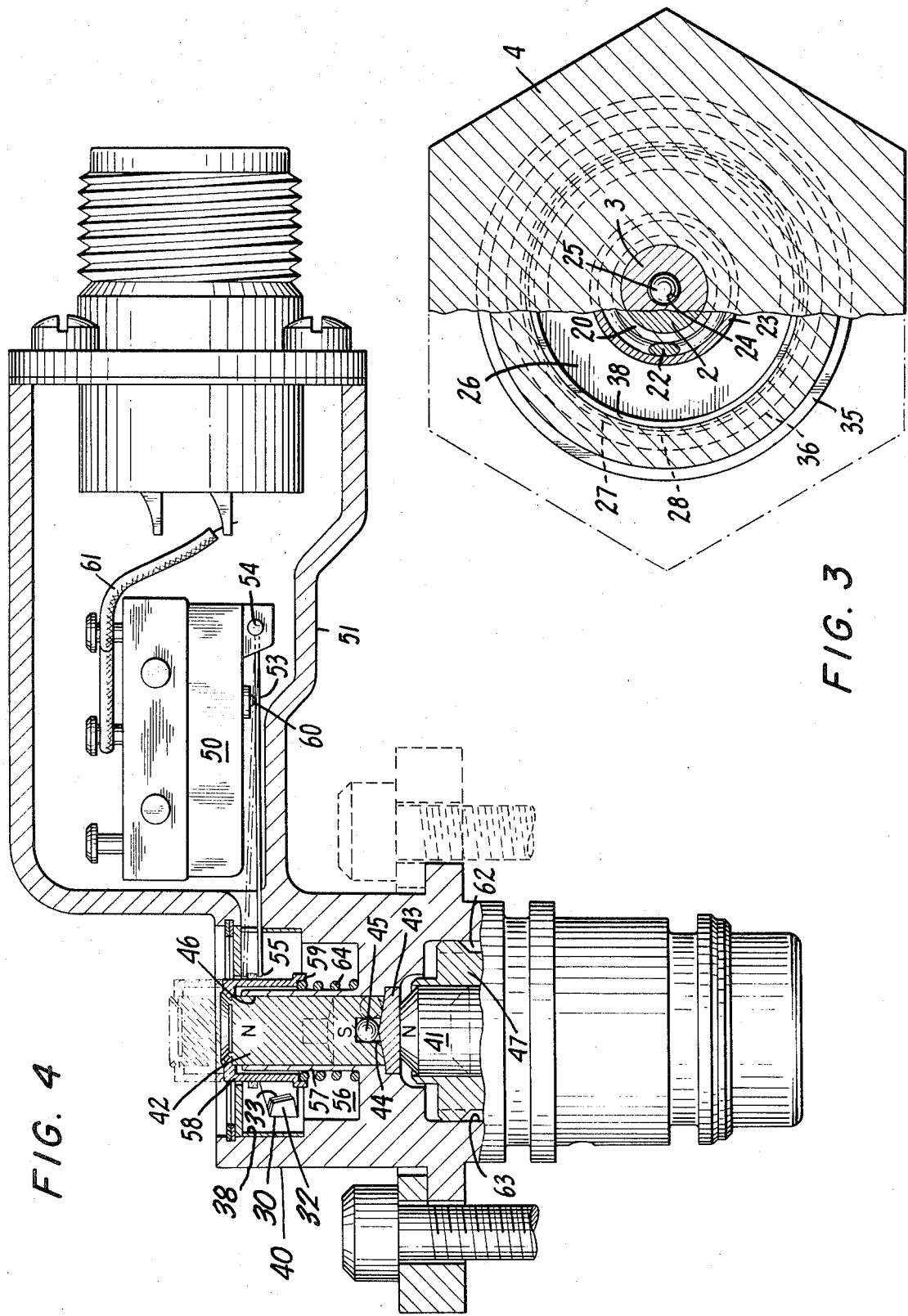

MAGNETIC PRESSURE INDICATOR

In any system wherein a fluid such as hydraulic fluid or the like is passed through a filter, it is customary to provide means for indicating when the filter element has become loaded, and requires replacement. Since the pressure drop across a filter increases in proportion to the accumulation of contaminants thereon, a suitable indication can be obtained by an indicator actuated when the differential pressure across the filter reaches a predetermined value. Many types of such devices are available, in which the indicating means is actuated mechanically, or electrically, or by other means.

One simple and very successful type of indicating device is the magnetic pressure indicator of U.S. Pat. No. 2,942,572 to David B. Pall. In this device, a first magnetic means is arranged to attract a second magnetic means so long as the two means are separated by less than a predetermined distance. Bias means propels the second magnetic element to an indicating position whenever that distance is exceeded. The first magnetic means is movable with a piston responsive to changes in pressure, and is normally biased towards the second magnetic means by a predetermined force. The second magnetic means is also movable with a piston, and while retained toward the first means by magnetic attraction when close enough thereto, is normally biased in a direction away from the first means by a force capable of overcoming the force of magnetic attraction whenever the first and second means are separated by the predetermined distance. The magnitude of the force of magnetic attraction relative to the spring biasing force determines the predetermined pressure differential at which the device is actuated. Thus, the device can be arranged to be actuated at any required differential pressure, by simple adjustment of these forces.

In the usual form of this device, the second magnetic means is arranged to project from the housing after actuation. In another form, the second magnetic means is arranged to give an electric signal upon actuation. In either case, the device can be reset merely by pushing the second magnetic means back toward the first magnetic means, into a position where the magnetic force once again overcomes the spring-biasing force. If the differential pressure across the filter element has meanwhile been reduced, due for instance to a reduction in the flow, the reset indicating means will thereupon remain in its normal position, and a person unaware that the device has already given its signal would have no way of knowing that the filter is no longer operative, and that the system is functioning on bypass. If the system is in operation on an aeroplane during flight, the resulting danger to the aircraft is very great, and may even result in loss of the aircraft.

In accordance with the invention, a magnetic differential pressure indicator is provided with means to prevent reset of the indicating means after actuation without actually inverting the device, thus forestalling cancellation of the signal. The device features a gravity-actuated loose nonmagnetic ball detent which assumes an obstructing position in any normal orientation of the indicator encountered under service, and prevents return of the indicating means to its normal nonindicating position.

The term "magnetic" as used herein encompasses both materials that are permanent magnets and materials that are attracted by magnets, whether permanently or temporarily magnetizable thereby.

The device in accordance with the invention comprises a first magnetic means spaced from and arranged to attract or repel a second magnetic means or keeper so long as the two means or the first means and keeper are within their mutual magnetic fields of force, the second magnetic means normally being retained in a first position, first bias means to retain the first magnetic means towards or away from the second magnetic means or keeper, and second bias means to propel the second magnetic means from the first position to an indicating position whenever the spacing between the two magnetic means is changed. The first magnetic means is movable with or is a first piston in response to changes in pressure, and is normally biased toward or away from the second magnetic means or keeper by a predetermined force. The second magnetic means is movable with or is a second piston, and is retained toward the first magnetic means or keeper by magnetic attraction, when close enough thereto, but is normally biased in a direction away from the first means or keeper by a force capable of overcoming the force of magnetic attraction to the first means or keeper whenever the first and second magnetic means or keeper are spaced by a predetermined distance.

As the loose nonmagnetic ball detent, there is provided a free-rolling ball normally nesting in a recess opening into the space within which the second magnetic means or piston moves, and retained in the recess by the second magnetic means or piston while the means or piston is magnetically attracted to the first magnetic means or keeper. Whenever the second piston and second magnetic means move a distance away from the first magnetic means or keeper sufficient to expose the recess, the loose ball rolls into the space and freely assumes a position in which it allows return of the second magnetic means only to a position where the spring-biasing force is still capable of overcoming the magnetic attraction between the second magnetic means and the first magnetic means or keeper. The recess is so arranged with respect to the second magnetic means or piston that the ball cannot be returned to the recess by the second piston, in any normal orientation of the indicating device encountered under service. The ball has a diameter greater than the distance within which the second magnetic means is attracted by magnetic force to the first magnetic means or keeper.

The first and second magnetic means are each movable, and can be magnets or attracted to magnets. The keeper is stationary, and is positioned therebetween, spacing them by a predetermined distance at least equal to the spacing dimension of the keeper, and can be a magnet or attracted by magnets, so that one at least of the magnetic means is attracted to the keeper. The other can be attracted to the keeper or other magnetic means, or repelled by the keeper or the other magnetic means.

At least one of the two magnetic means and keeper is a magnet. Preferably, two of these elements (in any combination) are magnets, and if desired, all three can be magnets, but three are not always as advantageous as two. In addition, the keeper can be of nonmagnetic material.

If the keeper is a magnet and the first and second magnetic means are merely attracted thereto, the device functions because the first magnet means when it moves from or moves towards the keeper changes the magnetic field between the keeper and the second magnetic means.

The keeper normally serves as the separating wall between the first and second magnetic means, and prevents fluid communication between the spaces within which the first and second magnetic means move. The keeper can be a piece fitted between these spaces, or an integral part of the housing defining such spaces. If the spaces are bores, usually coaxial, the keeper can close off and separate the two parts of the bore from each other, and define a pair of blind bores within which the two magnetic means move.

The first magnetic means can take any of several forms. It can, for example, be a piston, or part of a piston, as illustrated in the drawings, which can be in the form of a cylinder. It can also take the form of a piston or part of a piston of high surface area, such as a flexible disc or diaphragm, as shown and described, for instance, in U.S. Pat. No. 3,077,176, dated Feb. 12, 1963, to David B. Pall et al., or a bellows.

The second magnetic means also can be in the form of a piston, or part of a piston. It can be arranged to project from the housing for the indicator, for a visual indication. It also can be arranged to actuate a switch, as in U.S. Pat. No. 3,077,854 to David B. Pall, dated Feb. 19, 1963, or to move an indicator, such as a pointer, or magnetic fibers, either directly or magnetically.

The biasing means for the first and second pistons can take the form of a spring, such as a coil spring, a finger spring, a wave-form spring, a conical spring, or an annular disc spring, such as a Belleville spring. The biasing means can also be a third magnet, as disclosed in U.S. Pat. No. 3,140,690, to M.P.L. Siebel, in which case a spring can optionally be included or omitted.

The drawings illustrate preferred embodiments of the invention.

FIG. 1 is a view in longitudinal section taken through a typical pressure indicator according to the invention, in which the indicating device is in the form of a piston having a cap arranged to project from the housing within which the device is disposed, and showing the pressure indicator in a nonactuated position.

FIG. 2 is another view in longitudinal section taken through the pressure indicator of FIG. 1, and showing the device in the actuated position.

FIG. 3 is a cross-sectional view taken on the line 3—3 of FIG. 1 and looking in the direction of the arrows.

FIG. 4 is a view in longitudinal section through another embodiment of the pressure indicator of FIG. 1, in which the piston indicating means is arranged to actuate a switch.

The pressure indicator of FIGS. 1 to 3 comprises first and second magnetic elements 1 and 2, respectively, coaxially mounted on opposite sides of a separating wall or keeper 3 of magnetic material within a housing 4, which may be either of magnetic or nonmagnetic material. Elements 1 and 2 are positioned adjacent the wall or keeper 3, with magnetic poles opposed, so that each is drawn toward the wall by the resulting force of magnetic attraction therebetween. Preferably, the magnetic elements 1 and 2 are composed of permanently magnetized metal, such Alnico VI, Alnico VIII, or ceramic magnetic material, or the like. If desired, however, element 2 may be formed of a suitable magnetic material such as iron, for example. Wall 3 is formed of a suitable magnetic material such as iron, for example, but it can also be of nonmagnetic material.

Mounted in a tubular piston 5, magnetic element 1 is slidably supported in a cylindrical bore 6 in the housing 4, and is urged toward the wall or keeper 3 via bias means 7 which, in this embodiment, is a coil compression spring. The tubular piston 5 and magnetic element 1 can also be all in one piece of magnetic material. In order to prevent fluid from passing from the annular chamber 8 at one end of the bore 6 to the space 9 at the other end, a liquid-tight seal is provided between the bore 6 and the piston 5 by a O-ring 10 and a ring 11, of Teflon or other suitable gasketing material. The seal may also be effected by close tolerances between the piston and bore, and the sealing rings omitted. The coil spring 7 is selected according to the desired actuating pressure to permit the piston 5 to move away from wall 3 in the bore 6 whenever the pressure at the end of the piston 5 exceeds the pressure at the other end by an amount equal to the actuating differential pressure.

In this embodiment of the invention, the pressure indicator is arranged to measure the pressure drop across a pressure-influencing component, such as a filter (not shown, but illustrated in U.S. Pat. No. 2,942,572). Thus, fluid under pressure is applied to the component such as a filter via an inlet line (not shown) and emerges on the other side of the component through an outlet line (not shown). The bore 12 in the housing 4 is in fluid-flow connection with the inlet line, and communicates fluid pressure in the inlet line to the annular chamber 8 at one side of the piston 5, while the space 9 at the other end of the piston 5 is in fluid pressure communication with the outlet line via port 39. The difference in pressure between the inlet and outlet lines is a measure of the pressure drop across and therefore the clogging of the filter or other pressure-influencing component, and the different pressures are thus communicated to opposite sides of the piston 5.

If desired, in order to prevent dirt carried by the incoming fluid from blocking the bore 12, and/or chamber 8, possibly obstructing movement of the piston, a suitable annular filter element 37 is inserted over the outside of the housing 4 across the bore 12.

For ease in assembling of the piston 5, the bore 6 has its open end closed off by the cap 13, and the base of the spring 7 is retained by the cap against the abutment 14 of piston 5. The cap is permanently retained to the housing 4 by the flange 15. The spring can also be retained by the housing in which the indicator is installed, in which event the cap can be omitted.

The wall or keeper 3 is press-fitted in a leak-tight fit at the upper end of second bore 16 of the housing 4, or it may be an integral part of the housing 4; the bore 16 is coaxial with the bore 6, but it need not be. Secured to the skirt end 17 of the magnetic element 2 by an annular skirt 18 is a cap 19, which extends over the exterior of the cylindrical projection 20 of the housing 4, defining the bore 16 therewithin. The skirt 18 is swaged onto the cap. Within an annular recess 21 in the housing 4, surrounding projection 20, is a second bias means 22 which, in this embodiment, is a compression coil spring which extends from the inner face of the cap 19 within the flange 23 to the housing at the base of the recess 21, and urges the cap 19 and the magnetic element 2 to which it is attached away from the wall 3. This spring is selected so that it is retained in the stressed condition while the magnetic element 2 is held against the wall or keeper 3 by the attractive forces between the magnetic elements 1 and 2, or between element 2 and keeper 3; this attractive force between these elements is sufficient, so long as the adjacent poles of the magnetic elements 1 and 2 are separated by less than a predetermined distance, for example, one-sixteenth of an inch. Whenever the magnetic element 1 is moved away from the element 2 so that their adjacent poles are separated by more than one-sixteenth of an inch, however, the decreased force of magnetic attraction resulting therefrom is overcome by the force of the spring 22, and the cap 19 and element 2 are driven away from the wall 3.

In the wall 3 between the two elements 1 and 2 is a recess 24, within which a nonmagnetic stainless steel ball 25 rests loosely. The diameter of the ball is greater than the predetermined distance over which the magnetic element 2 is attracted to the wall or keeper 3 with a magnetic force greater than that of spring 22, in this case, for example, 0.050 inch. The face 34 of the wall 3 slopes away from the recess 24 toward the sides of the bore 16. The face of the magnetic element or piston 2 also slopes in a matching taper from the axial center of the magnetic element, so that the piston sits snugly against the face of the wall 3 whenever the element 2 is magnetically attracted toward the element 1 or wall 3, and thus holds the ball 25 in the recess 24. Whenever the piston and element 2 move away from the wall or keeper 3 a distance at least equal to the diameter of the ball, the ball drops out of the recess and then rolls down the sloping face of the piston 2, to come to rest against the side of the bore 16, and remains in this position, by force of gravity.

In order to prevent the cap 19 and magnetic element 2 from being driven completely out of the bore 16 upon actuation, the open end of the annular recess 21 is closed off by an annular disc 26, retained there by a spiral lock washer 27, snugly held in the narrow groove 28 at the end of the recess 21. The inner periphery 29 of the disc annulus closely abuts, but does not touch, the cap 19. The flange 23 (which retains the spring 22) engages the disc 26 whenever the cap is thrust outwardly by the spring, thereby preventing the cap from proceeding further than the position shown in FIG. 2.

A conventional bimetallic element 30 is attached to spring retaining ring 38, which is biased against the inside wall of the recess 21, just below the flange 23, retained there against the shoulder 31 by its own spring force. The bimetallic element 30 is preferably comprised of two arcuate inner and outer strip portions 32, 33 joined together, for example by a weld, and both arranged to bend inwardly with decreasing temperatures. At normal temperatures, element 30 has a minimum radius greater than that of the flange 23, and permits the cap 19 to ride through the aperture therebetween on actuation. However, at temperatures below a preselected value, at which for example the fluid to be filtered increases appreciably in viscosity, for example, 33° to 62° F., the element 30 contracts inwardly, so that the inner strip 33 extends over the face of the cap 19 just within the flange 23, thus engaging the flange and preventing actuation of the pressure indicator.

In operation, fluid pressure in the inlet line is communicated via the duct 12 to the space 8 of the cylindrical bore 6, urging the magnetic element 1 and piston 5 away from wall 3 against the force of the spring 7 and the pressure from the outlet line, communicated to space 9 via port 39. Whenever the difference between the inlet and outlet pressures is greater than the force of the spring 7, the piston 5 is driven away from wall 3 in the bore 6. After the magnetic element 1 is moved to a position more than one-sixteenth of an inch away from the magnetic element 2, the attractive force therebetween is less than the force of the spring 22, and the magnetic element 2 is driven away from the wall 3 until the cap 19 (which if desired, may be of a suitable eye-catching color, such as red, orange or yellow) emerges through the aperture 34, and the flange 23 abuts the inside surface of the disc 26, where it is held firmly by the spring 22, in the position shown in FIG. 2. At the same time, the ball 25 is released from its recess 24, rolls along the surface of the piston 2, and comes to rest against the side of the bore 16.

The cap 19 in this position indicates that the pressure difference is greater than the predetermined value in accordance with which the spring 7 has been selected. As an example, the spring 7 may be arranged to permit the magnetic element 1 to be driven away from the wall 3 whenever the pressure difference exceeds 35 psi, and thus give a signal.

It will be apparent from FIG. 2 that the ball 25 prevents resetting of the magnetic element 2 to its original position, shown in FIG. 1. If the magnetic element 2 be pushed upwardly, the ball 25 is retained by the tapered face of piston 2 in position against the side of the bore 16. While the ball 25 moves with piston 2 along the bore until it engages the tapered face of wall 3, it thereafter prevents the piston from being pushed any further than a distance from the wall 3 equal to the diameter of the ball 25, in this case, for example 0.050 inch. Since this distance, however, is greater than one-sixteenth inch, more than the distance over which the magnetic element 2 is attracted to the wall or keeper 3 by a force greater than the biasing force of spring 22, the piston 2 can be held in this position only while it is retained there manually. As soon as the manual force is removed, the piston returns to the indicating position shown in FIG. 2 under the force of the spring 22.

At temperatures below 32° F., for example, the thermostatic element 30 contracts, to move the inner face 33 of the strip 30 over the cap 19 to engage the flange 23. Thus, when the piston and the magnetic element 2 seek to move away from the wall 3 under a differential pressure exceeding the biasing force of spring 7, resulting from increased viscosity of the fluid, the inner edge of the strip 30 intercepts the flange 23, preventing a false indication of, for example, filter clogging.

If desired, this pressure indicator may be utilized to indicate a total pressure above atmospheric instead of a pressure differential, by communicating port 39 opening to space 9 of bore 6 to the atmosphere. Similarly, an absolute pressure may be indicated by connecting the port 39 and space 9 of bore 6 to a vacuum.

A flexible boot 35, the enlarged periphery of which is resiliently mounted in the annular recess 36 about the exterior of the housing 4, extends across the face of the housing, and protects the piston 2 while it is in the projecting position shown in FIG. 2. The boot is of transparent material, such as silicone rubber, so that the indicator cap 19 is fully visible through the boot.

In order to reset the cap 19 and piston 2 to the non-indicating position shown in FIG. 1, it is necessary to return the ball 25 into the recess 24. To do this, one must either remove the device from the installation, or remove the subcomponent from the installation on which the device is mounted, and invert it. In the inverted position, the ball 25 rolls freely along the now inwardly-inclining face 34 of the wall 3, and drops readily into the recess 24. In this position of the ball, the piston 2 and cap 19 can be returned to the position shown in FIG. 1. The device can then be reinverted, and is ready for reinstallation and reuse.

Normally, however, because of the fixed nature of the fluid flow connections to the inlet and outlet lines, the pressure indicator cannot be removed without closing down the system, such as would be done in a complete reservicing, at the time a filter element is replaced. As a practical matter, therefore, resetting cannot be accomplished while the fluid system is still in use, which means that the indicator will continue to give an indication of the need for changing the filter element or other component until in fact the filter element or component has been changed.

The pressure indicator shown in FIG. 4 corresponds to an inverted indicator of FIG. 1, and arranged to operate in the inverted position. In this case, the piston and magnetic element 2 are adapted to actuate an electrical signal, which, by choice of the appropriate electrical circuits, in any conventional manner, can be adapated for example to shut off flow or to give a warning signal.

The indicator comprises a housing 40 with two magnetic elements 41 and 42, coaxially mounted on opposite sides of the wall or keeper 43. The magnetic element or piston 42 has therewithin a recess 44 in which is loosely held a nonmagnetic ball 45, 0.060 inch in diameter, or any other diameter coupled to the strength of the magnetic field between the two elements 41 and 42. The inner face of the piston 42 slopes from the recess 44 and toward the sides of the bore 46. The wall 43 is also tapered from the center toward the sides of the bore 46. Thus, upon movement of the piston 42 away from wall or keeper 43 over a distance greater than the diameter of the ball, the ball emerges from the recess 44, and rolls downwardly along the sloping face of the wall or keeper 43, to come to rest against the side of the bore 46, in the position shown in phantom lines in FIG. 4.

To provide an electrical signal upon actuation of the indicator, a switch 50 is mounted in a housing 51 which as shown is a part of the indicator housing 40, but need not be. Mounted on the switch is a lever 53 pivotally supported at 54 with one end 55 projecting into the annular recess 56 of the housing, defined about cylindrical projection 57, to a point abutting but not touching the cap 58, above the flange 59. Positioned above the lever arm 53, a switch actuator 60 in the form of a push button is movable by the lever arm 53 to actuate the switch 50 whenever the cap moves in the annular recess 56 so that flange 59 comes into contact with the end 55 of the lever arm 53, moving the arm 53 against push button 60. To provide a remote indication of the actuation of the indicator, suitable conductors 61 from the switch 50 are arranged in any conventional manner to complete appropriate electrical circuits whenever the switch is actuated.

In operation, a source or inlet of high pressure is connected through a duct (not shown) to the space 62 at the top of the cylindrical bore 63, urging the magnetic element 41 and piston 47 away from wall 43 against the force of a spring (not shown), as in the device of FIGS. 1 to 3. The space beyond the piston 47 can be connected to the outlet line (in which case the device acts in response to differential pressure) or to the atmosphere, or to a vacuum. Whenever the difference between the pressures on opposite sides of the piston 47 is greater than the force of the spring, the piston 47 is driven away from wall 43 in the bore 63. Whenever the magnetic element 41 has been driven more than one-sixteenth of an inch from the wall 43, the indicator and switch will actuate. The magnetic element 42 and cap 58 will be driven by spring 64 away from the wall 43 until the flange 59 abuts the end 55 of lever arm 53, thus moving the arm against the push button 60, and actuating the switch. At the same time, the movement of the piston 42 releases the ball 45 from its recess 44, and the ball rolls down along the tapered wall 43, to come to rest against the side of the bore 46.

At the same time as the switch 50 is actuated, the cap 58 emerges from the housing, and also gives a visual signal of the actuation of the indicator.

If one attempts to reset the indicator by pushing the cap 58 downwardly against the spring 64, the cap and piston 42 can only be pushed to the point at which they contact the ball 45, after which they are held spaced from the wall or keeper 43 by a distance equal to the diameter of the ball, for example, 0.060 inch. This distance is greater than the distance within which the magnetic element 41 exerts a magnetic force on wall or keeper 43 sufficient to hold the element 42 against the wall 43, and thus retain the cap 58 within the housing 51 against the force of spring 64.

According to the distance the flange 59 is spaced from the end of cap 58, the lever arm may or may not be fully withdrawn from contact with the push button 60, when the piston 42 is pushed down against ball 45. In the device shown, the flange is so placed on cap 58 that by pushing the piston and cap inwardly against the ball, the arm 53 is released from contact with the push button 60, and the switch is deactuated, but it is reactuated as soon as the cap and piston are allowed to return to the indicating position.

By appropriate location of an acutating flange like flange 59 on the cap 58, nearer its tip, the flange does not become disengaged from the tip 55 when the cap is pushed downwardly against the ball 45, and the arm 53 does not pivot into a position away from actuation of the push button 60, so that in this case even manual movement cannot result in deactuation of the switch 50.

The ball is replaced in recess 44 as in the device of FIGS. 1 to 3. The device is inverted, the ball rolls into the recess, and piston 42 is then pushed into its normal position against wall 43.

While in the devices shown the ball is retained in a recess either in the wall between the magnetic elements or in the indicating piston, it will be appreciated that the recess could also be positioned in the wall of the housing or in the side wall of the bore in which the indicating piston moves. In this event, the recess should be arranged to slope downwardly, according to the normal orientation of the indicating device, and positioned so that when the indicating piston is withdrawn a sufficient distance, greater than the distance within which the magnetic elements or keeper wall exert a sufficient magnetic attraction upon each other to overcome the force of the spring, causing movement of the piston into an actuating position, the ball will roll out from the recess into the bore, and remain there, in a position to prevent resetting of the indicator. It is preferred, however, in most cases to have the recess in an uppermost position in the wall or piston, in order to prevent accidental return of the ball into the recess by a sidewise movement or roll of the device, as could happen in the case of an aircraft.

In the embodiments shown in the drawings, the magnetic elements 1 and 2 or 41 and 42 are arranged so as to attract each other, with opposed poles. An equivalent result can be obtained by arranging the elements 1 and 2 or 41 and 42 so as to be mutually repelling with like poles facing each other. This requires only a small modification of the structure shown, that would be obvious to anyone skilled in this art with a knowledge of magnetic principles, using the principles of this invention as discussed above.

In the embodiment shown in FIGS. 1 to 4, the magnetic element 1 or 41 can be reversed, so that the south pole faces the south pole of magnetic element 2, or 42, and the element 1 or 41 relocated so that it is at the opposite end of the bore, in its normal position, with the spring 7 relocated to the opposite side of the piston, to bias it in the opposite direction. The pressure-sensing line connections 12 and 39 also have to be reversed, so that outlet line pressure is sensed via bore 12 and inlet line pressure sensed via port 39. Now, a pressure differential sensed by the piston 1 or 41 via bore 12 and port 39 tends to move the piston towards wall 3 or 43, repels magnetic element 2 or 42 away from wall 3 or 43, and eventually to an actuating position. In this type of embodiment of course elements 1 and 2 or 41 and 42 must both be magnets, unless wall 43 is a magnet of opposite polarity instead of element 2 or 42.

It will be understood that the devices shown are designed so that the higher pressure of the two pressures being sensed is communicated to the piston 1 or 41 via bore 12. When the magnetic elements are repelling, the higher pressure is communicated to the piston 1 or 41 via port 39.

The terms "react with" and "reaction with" as used in the claims refer to the forces of magnetic attraction or repulsion between the first and second magnetic means. The first magnetic means is spaced from and arranged to attract or repel and thereby react with the second magnetic means, so long as the two means are within the mutually reactive magnetic fields of force. The term "magnetic means" encompasses both magnets and magnetically attracted materials, and it will be understood that a keeper can be interposed therebetween, and that the keeper can be of magnetic or nonmagnetic material.

I claim:

1. A magnetic pressure indicator which cannot be reset after actuation without inverting the device, thus forestalling cancellation of the signal, comprising, in combination a first magnetic means spaced from and arranged to react with a second magnetic means so long as the two means are within their mutually reactive magnetic fields of force; first bias means to retain the first magnetic means in a first position with respect to the second magnetic means, the second magnetic means being normally retained in a second position; and second bias means to propel the second magnetic means from the second position to an indicating position whenever the spacing distance between the two magnetic means is changed, the first magnetic means being movable in response to changes in pressure, and normally biased in the first position with respect to the second magnetic means by a predetermined force, and the second magnetic means being normally biased by the bias means to an indicating position by a force capable of overcoming the force of magnetic reaction with the first means whenever the first and second magnetic means are spaced by a predetermined distance; a loose free-rolling nonmagnetic ball normally nesting in a recess opening into the path of the second magnetic means and retained in the recess by the second magnetic means while the means is magnetically reacted with the first magentic means, but whenever the second magnetic means moves a distance away from the first magnetic means sufficient to expose the recess, the ball rolls into the path of the second magnetic means and allows return of the second magnetic means only to a position where the spring-biasing force is still capable of overcoming the force of magnetic reaction between the second magnetic means and the first magnetic means, the recess being so arranged with respect to the second magnetic means that the ball cannot be returned to the recess by the second magnetic means in any normal orientation of the indicating device encountered under service, and the ball having a diameter greater than the distance within which the second magnetic means is reacted by magnetic force to the first magnetic means.

2. A magnetic pressure indicator according to claim 1, in which the second magnetic means is in the form of a piston, moving in a bore into which the recess opens.

3. A magnetic pressure indicator according to claim 1, in which the second magnetic means is a piston of high surface area.

4. A magnetic pressure indicator according to claim 1, in which at least one of the first and second bias means is a spring.

5. A magnetic pressure indicator according to claim 1, in which at least one of the first and second bias means is a magnet.

6. A magnetic pressure indicator according to claim 1, in which the recess is in the second magnetic means.

7. A magnetic pressure indicator according to claim 1, having a wall between the first and second magnetic means and the recess disposed in the wall opposite the second magnetic means.

8. A magnetic pressure indicator according to claim 1, in which the second magnetic means is arranged so as to become visible after actuation.

9. A magnetic pressure indicator according to claim 1, having the second magnetic means arranged so as to actuate a switch.

10. A magnetic pressure indicator according to claim 1, having a bimetallic means arranged to prevent movement of at least one of the first and second magnetic means at temperatures below a predetermined minimum.

11. A magnetic pressure indicator according to claim 1, in which both the first and second magnetic means are magnets.

12. A magnetic pressure indicator according to claim 1, in which one of the first and second magnetic means is a magnet, and one is of magnetizable material.

13. A magnetic pressure indicator according to claim 1, in which the first and second magnetic means are separated by a wall, both of the magnetic means are of magnetizable material, and the wall is a magnet.

14. A magnetic pressure indicator according to claim 1, in which one of the first and second magnetic means is a magnet and the wall is a magnet.

15. A magnetic pressure indicator according to claim 1, in which the first and second magnetic means are mutually attracting.

16. A magnetic pressure indicator according to claim 1, in which the first and second magnetic means are mutually repelling.

17. A magnetic pressure indicator according to claim 1, in which the first magnetic means is spaced from and arranged to attract the second magnetic means, and the first bias means is arranged to retain the first magnetic means in a position toward the second magnetic means.

18. A magnetic pressure indicator according to claim 1, in which the first magnetic means is spaced from and arranged to repel the second magnetic means, and the first bias means is arranged to retain the first magnetic means in a first position away from the second magnetic means.

19. A magnetic pressure indicator according to claim 1, in which the first and second magnetic means are each spaced from and arranged to attract a keeper, and the first bias means is adapted to retain the first magnetic means in a first position towards the keeper, while the second bias means is adapted to propel the second magnetic means away from the keeper.

20. A magnetic pressure indicator according to claim 1, in which the first magnetic means is spaced from and arranged to repel a keeper, and the first bias means is arranged to retain the first magnetic means in a first position away from the keeper, while the second magnetic means is arranged to attract the keeper, and the second bias means is adapted to propel the second magnetic means away from the keeper.

* * * * *